Feb. 3, 1970                J. W. LUBICH                3,493,741
                         OBJECT STOPPING SYSTEM
Filed March 26, 1968                              3 Sheets-Sheet 1
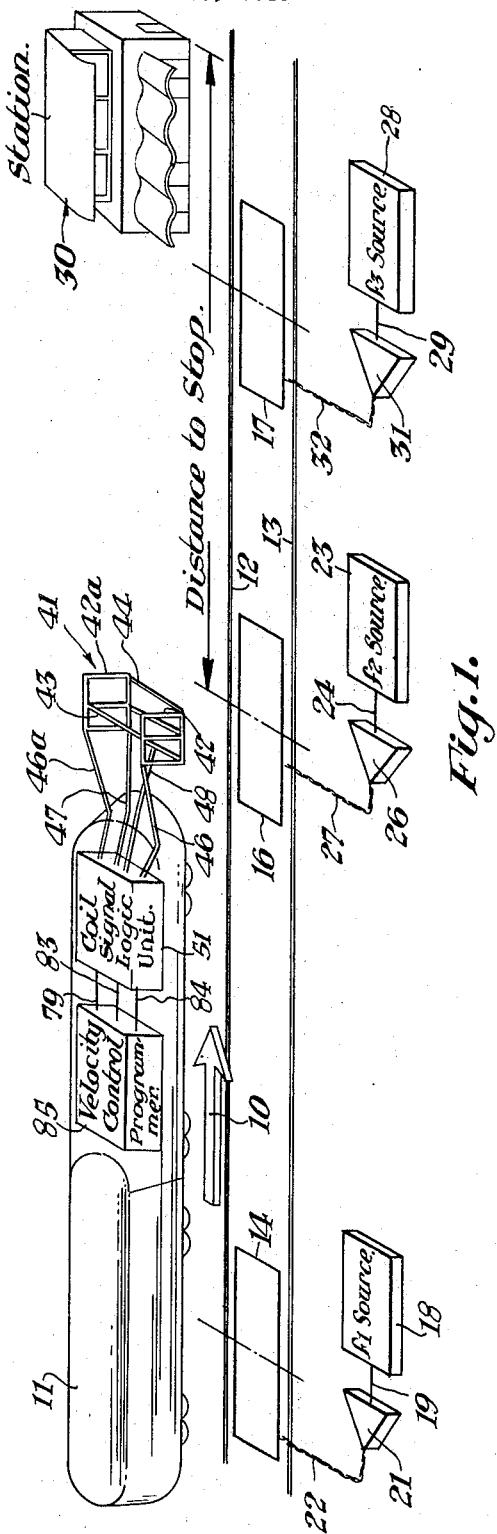
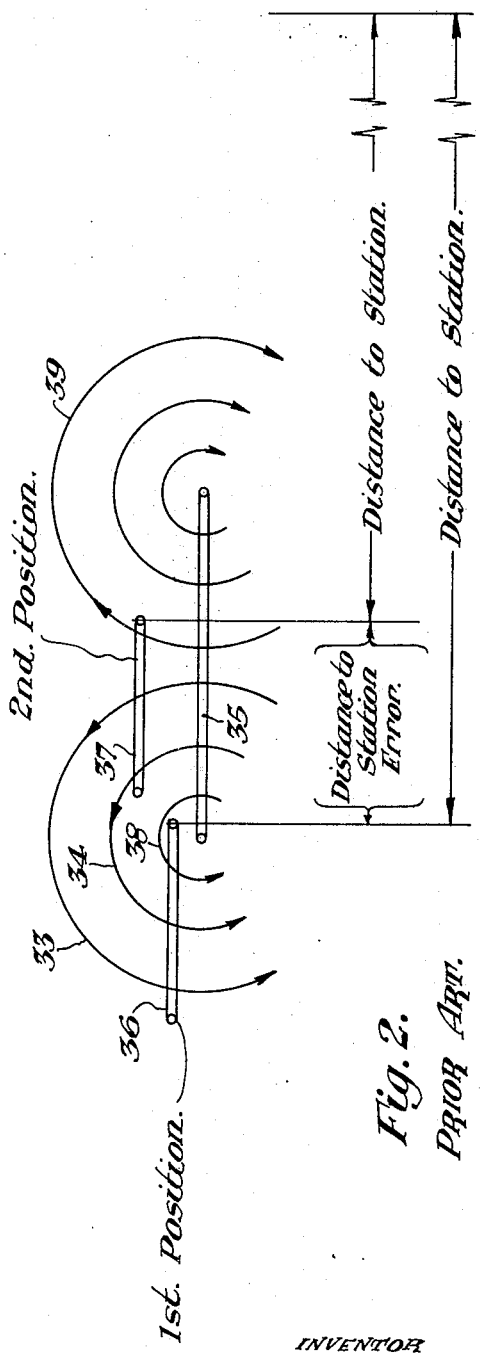
Fig. 1.
Fig. 2.
PRIOR ART.
INVENTOR
Joseph W. Lubich.
BY
W. L. Stout
HIS ATTORNEY INVENTOR
Joseph W. Lubich.
BY
W. L. Stout

HIS ATTORNEY

United States Patent Office 3,493,741
Patented Feb. 3, 1970

1

3,493,741
OBJECT STOPPING SYSTEM
Joseph W. Lubich, Millvale, Pa., assignor to Westinghouse Air Brake Company, Swissvale, Pa., a corporation of Pennsylvania
Filed Mar. 26, 1968, Ser. No. 716,143
Int. Cl. B61l 3/06, 21/00, 1/08
U.S. Cl. 246—167                               16 Claims

ABSTRACT OF THE DISCLOSURE

This invention relates to a precision vehicle stopping system which functions as the vehicle travels along a predetermined way. The system includes at least one signal transmitting coil positioned along the way. In conjunction therewith are at least a first and a second signal receiving coil carried on the vehicle. These receiving coils are included in the system in such a way that the second signal receiving coil is positioned on the vehicle so that the direction of travel of the vehicle is normal to a plane in which the second signal receiving coil is contained, and the first signal receiving coil is positioned on the vehicle in a plane which is at an angle to the plane containing the second signal receiving coil. A coil signal logic unit is electrically coupled to the first and the second signal receiving coils, respectively, and is also electrically coupled to a vehicle stopping control unit to thereby control the vehicle stopping control unit. This control occurs whenever the first and second signal receiving coils concurrently pass the signal transmitting coil and the second signal receiving coil simultaneously has no output signal while the first signal receiving coil does have an output signal.

---

This invention relates to a precision object stopping system.

More specifically, this invention relates to a precision object or vehicle stopping system which functions along a predetermined way as the object travels along the way. The system includes at least one signal transmitting coil positioned along the way. In conjunction therewith are at least a first and a second signal receiving coil carried on the object. These receiving coils are included in the system in such a way that the second signal receiving coil is positioned on the object so that the direction of travel of the object is normal to a plane in which the second signal receiving coil is contained, and the first signal receiving coil is positioned on the object in a plane which is at an angle to the plane containing the second signal receiving coil. A coil signal logic unit is electrically coupled to the first and the second signal receiving coils, respectively, and is also electrically coupled to an object stopping control unit to thereby control the object stopping control unit. This control occurs whenever the first and second signal receiving coils concurrently pass the signal transmitting coil and the second signal receiving coil simultaneously has no output signal while the first signal receiving coil does have an output signal.

Often it is desired that an object moving along a predetermined way be capable of precision stopping at a specified stopping point. Such precision stopping can be accomplished by present object stopping system, but frequently these stopping systems fail to function with precision because of external influences which interact with the object stopping system devices. Hence, it is very probable that while it may be desired to stop an object at a designated stopping point, the object, in fact, may stop at a greater distance from the designated stopping point, or in the alternative stop short of the desired point. Many of the present object stopping systems are based upon frequency selection and coordination via the use

2 of a wayside transmitting coil which operates at a discrete frequency level, and coil or coils, positioned on the object, and activated by the wayside transmitting coil such as to provide an indication of the relative position and speed of the object with respect to the stopping point. Should some external influence cause a flux field to be generated in the present signal receiving coil arrangements, the indication transferred by the signal receiving coil arrangement may be erroneous and therefore cause the object to stop short or ahead of the stopping point.

The problem of precision stopping is becoming increasingly critical in the area of mass transit where trains are to be operated in a totally automated fashion. Current requirements set by the transit authorities are demanding vehicle stopping to within plus or minus two inches. It is this type of problem which the invention to be described addresses itself and provides a solution which results in accuracy never before consistently obtained.

The precision object stopping system according to the present invention operates with the signal receiving coils in a specified alignment with respect to the wayside transmitting coil such that an increased number of criteria must be met in order that an indication be present. In this manner the problems outlined above are solved in a unique fashion which is the subject of the invention to be described.

It is therefore an object of the invention to provide a precision stopping system that is free from the effects of external flux fields by the utilization of a novel coil arrangement in combination with logic circuitry and an object stopping mechanism.

Another object of this invention is to provide an improved vehicle stopping system that assures flawless detection of the distance to a station being approached by the use of multiple criteria in the determination of the passing of a predetermined point before the station.

In the attainment of he above objects, the preferred embodiment provides a vehicle stopping system which functions as the vehicle moves along the way. The basic components of the system include a plurality of wayside signal transmitting coils each having a signal output which differs from the other transmitting coils. The vehicle employed in the system carries at least a first and a second signal receiving coil. The first signal receiving coil is positioned on the vehicle in a plane which is at an angle to a plane containing the second signal receiving coil and normal to the plane containing the first signal receiving coil is perpendicular to the direction of travel of the vehicle. The second signal receiving coil is positioned on the vehicle such that the direction of travel of the vehicle is normal to a plane in which the second signal receiving coil is contained.

A coil signal logic unit is electrically coupled to the first and the second signal receiving coils and a vehicle stopping control unit. The coil signal logic unit includes a signal detecting network which is responsive to the plurality of signal outputs from the wayside signal transmitting coils to selectively control the vehicle stopping control unit whenever the first and the second signal receiving coils concurrently pass the signal transmitting coils and the second signal receiving coil has no output while simultaneously the first signal receiving coil does have an output.

In one embodiment the plane of the first signal receiving coil is parallel to a plane containing the signal transmitting coils.

In another embodiment the plane of the first signal receiving coil is at right angles to a plane containing the signal transmitting coils.

Other objects and advantages of the present invention will become apparent from the ensuing description of illustrative embodiments thereof, in the course of which reference is had to the accompanying drawings in which:

FIG. 1 is a block diagram of a system embodying the invention.

FIG. 2 is an illustration of prior art problems solved by the use of the invention here involved.

Figure 3:
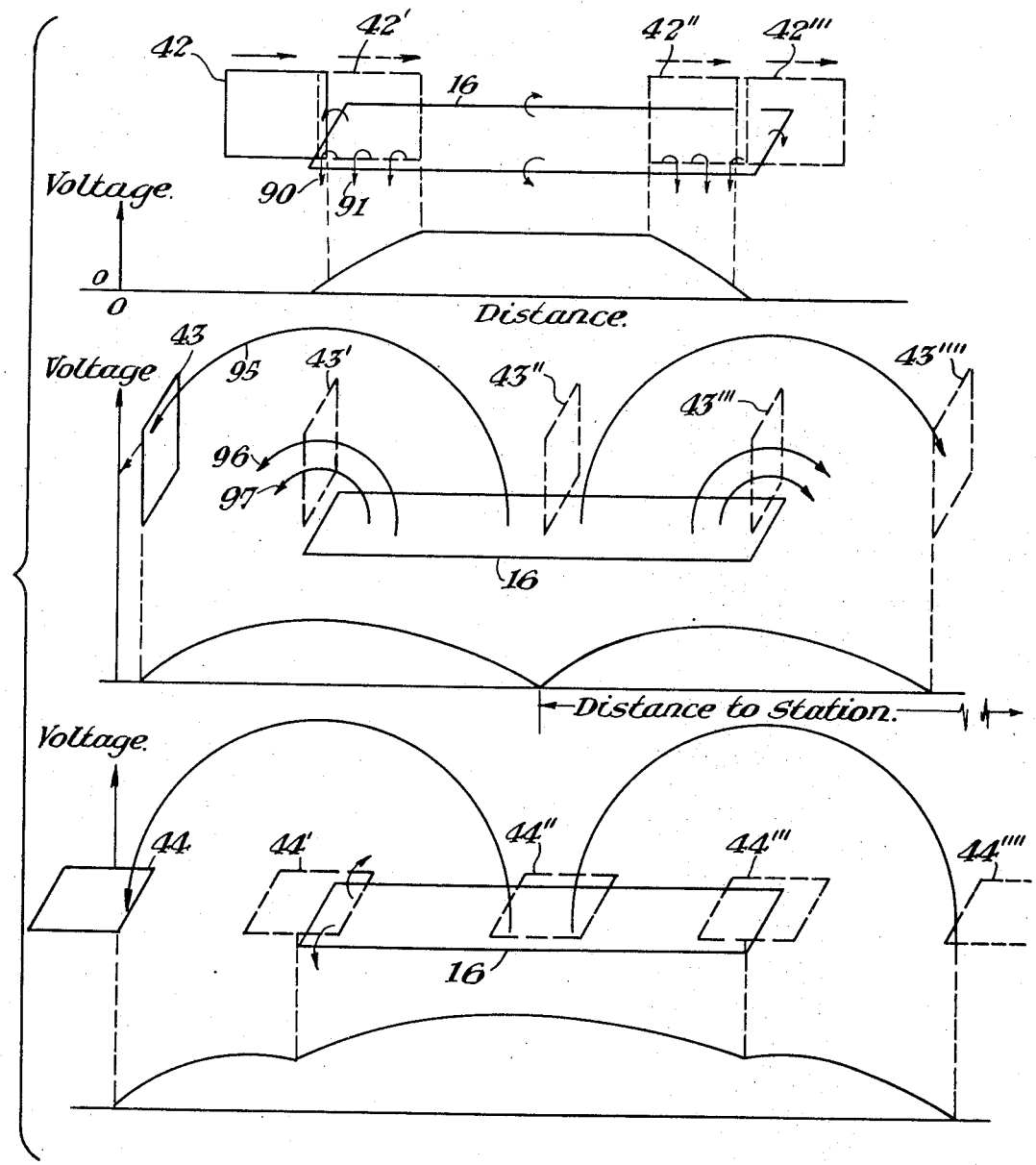
FIG. 3 is a series of related illustrations of magnetic flux fields and their cooperation with coils involved in the practice of the invention.

A description of the above embodiments will follow and then the novel features of the invention will be presented in the appended claims.

Reference is now made to FIG. 1 in which there is illustrated in block diagram form a system embodying the invention to be described more fully hereafter. Depicted in FIG. 1 is a train 11 shown somewhat elevated above a pair of rails 12 and 13. At the front of the train 11 is a multiplanar coil proximity detector 41 which forms a part of the invention. It should be understood that the first illustration is greatly exaggerated for purposes of explanation. Therefore, while the proximity detector 41 is shown spanning the rails, in actual practice these coils would fit in a box six inches wide and six inches high with a length of eight inches. These are but matters of design. The direction of the train 11's travel is indicated by the arrow 10. Positioned between the rails 12 and 13 are a series of coils 14, 16 and 17. These coils are referred to hereafter as transmitting coils or wayside transmitting coils. Note also that the distance between transmitting coils, as well as the width and length of the coils, is exaggerated for purposes of illustration only. Each of the coils is supplied with a different frequency signal. For example, coil 14 receives an $f1$ frequency signal from the $f1$ source 18 which is transmitted over lead 19 to an amplifier 21, thence to lead 22 and finally to the wayside transmitting coil 14. In a similar fashion, an $f2$ frequency signal is supplied to the transmitting coil 16 from the $f2$ source 23 over lead 24, through amplifier 26, lead 27, and thence to the wayside transmitting coil 16. And finally, the third transmitting coil shown in this embodiment is wayside transmitting coil 17 which has an $f3$ frequency signal source 28 which has its output delivered over the lead 29, through amplifier 31, and lead 32 to the transmitting coil 17. The functional cooperation of these transmitting coils will be spelled out in more detail hereafter.

Depicted in the right-hand portion of this figure is a station 30, or a point at which the train 11 is desired to be brought to a precision stop. In the preferred embodiment the object to be stopped is a train and the place at which it is to be stopped is a station 30. In a more general vein, the vehicle, which is referred to here as carrying that portion of the instant invention, might also be referred to as an object which is desired to be stopped at a precise point.

The multiplanar coil proximity detector 41 is comprised of a number of different coils. A signal receiving coil 44 is disposed in a plane in a parallel relationship to the plane which contains the signal transmitting coils 14, 16 and 17. This signal receiving coil 44 is electrically connected via lead 48 to a coil signal logic unit 51, shown here in dotted outline, the function of which will be described more fully hereafter.

Signal receiving coils 42 and 42a, which will be referred to as first signal receiving coils, are electrically connected respectively to the coil signal logic 51 by electrical leads 46 and 46a. The positions of these two first signal receiving coils 42 and 42a are such that both coils are needed when the vehicle, in this case a train, is operating in electric propulsion territory where return current is present in both the rails 12 and 13. The reasons for this will be explained more fully hereafter.

A second signal receiving coil 43, disposed in a plane which is normal to the direction of travel of the vehicle as it moves along the way, is electrically connected via lead 47 to the coil signal logic unit 51, which coil signal logic unit is electrically coupled to a velocity control programmer 85 via leads 79, 83 and 84. The velocity control programmer per se does not form a portion of this invention but is an element of the combination necessary for the functioning of the train stopping system. The velocity control programmer 85 is set out in significant detail in a copending application for Letters Patent of the United States, Ser. No. 527,594, filed Feb. 15, 196, by Blanchard B. Smith, for Motion Control System for Rapid Transit Vehicles, assigned to the same assignee as this application.

The system which has just been described in broad terms embodies the invention which will be now described in more detail.

Reference is now made to FIG. 2 which sets forth a prior art illustration of the problems which the invention solves. It will be noted that there is present a wayside signal transmitting coil 35 shown in cross-section here. While no source of power is shown illustrated in this FIG. 2, it is to be understood that the wayside signal transmitting coil 35 of the prior art is supplied with a suitable frequency signal. The signal that is present in the coil causes the flux paths depicted by flux lines 33, 34, 38 and 39 to appear about the wayside signal transmitting coil. It will be noted that there is a second signal receiving coil 36 shown in cross-section, which second coil is shown in a first position. This signal receiving coil 36 would be positioned on a vehicle or object whose passage was sought to be detected. As one can well appreciate from FIG. 2, should the signal receiving coil 36 be in the position designated the first position, a significant number of flux lines, in this instance 33, 34 and 38, would pass through the coil, inducing therein a voltage, the level of which we might arbitrarily say was of a sufficient level to trigger some other device not shown in this figure to indicate the appearance of the object which carries signal receiving coil 36. Note that should a signal receiving coil of the same type as signal receiving coil 36 move to a position shown by signal receiving coil 37 and designated as a second position, this signal receiving coil 37 would be cut by flux lines 33 and 34, as well as 39. Since the strength of the electromagnetic field that surrounds the wayside signal transmitting coil 35 diminishes as a function of distance, it may well be appreciated that the signal receiving coil 37 would have to move significantly into the total flux fields that surround the wayside signal transmitting coil 35 before sufficient voltage would be generated in the signal receiving coil 37 to permit the triggering of some vehicle or object carried device indicating the presence of the vehicle or object.

It will be noted immediately beneath the wayside signal transmitting coil 35 there are set forth several legends. At the bottom of this figure, when the signal receiving coil 36 is in the first position and a signal is produced of a sufficient level to trigger some device on the vehicle, this would produce an indication to other vehicle or object mounted equipment that there was some specified distance to go to a station. Note though when signal receiving coil 37 is in the second position, a little higher than signal receiving coil 36 was in the first position, a sufficient signal will not be generated until the signal receiving coil 37 has advanced to what is designated as the second position, and then would produce an output signal which would indicate that there was some distance to the station about to be approached. It will be noted that there is now a distance to station error involved merely because the coils have moved from one position to another and changed in some degree the height above the transmitting coil.

This is but one of the problems that may arise in utilizing a single coil to determine the position of a passing vehicle or object.

Not shown here but presenting a problem of a similar magnitude is that situation where there are coils positioned along the wayside or along a path upon which the object is traveling and include within them resonant circuits which coact with a coil on the object or vehicle passing by. When the vehicle-carried coil passes over the inert wayside coil an imbalance is established in the circuits contained in the vehicle or object carried coil and this produces a signal output indicative of the presence of the vehicle carrying this coil. It has been found in many instances that should there appear along the wayside or the path upon which the object is traveling, physical structures left there through inadvertence, these structures will cause a resonant condition to appear in the vehicle-carried coil producing an indication that there has been passed a fixed point prior to reaching a stopping point, and this will produce an error condition causing the object or vehicle to come to a stop where it was not intended.

To this type of problem the invention now to be described more fully provides a solution by adding to the factors required in the recognition of the passage of a predetermined point. Reference is now made to FIG. 3 in which there are illustrated three situations that occur when the signal receiving coils 42, 43 and 44 approach a wayside signal transmitting coil, for example, signal transmitting coil 16, shown in FIG. 1. At the outset it should be noted that FIG. 3 is divided into three separate parts. The uppermost portion of FIG. 3 shows the coil 42, which has been termed a first signal receiving coil, about to enter and pass by the wayside signal transmitting coil 16. Immediately beneath the illustration depicting the first signal receiving coil 42 and the signal transmitting coil 16 is a graph ploted with voltage as the ordinate and distance as the abscissa. No values have been given to the ordinate or the abscissa since they are shown only to depict the relative changes present as the first signal receiving coil 42 passes over and past the wayside signal transmitting coil 16. It can be seen that as the first signal receiving coil 42, shown in solid outline in this upper portion of FIG. 3, is just entering over the wayside signal transmitting coil 16, at least one or more flux lines, such as 90, will pass over and through the first signal receiving coil 42.

It should be explained at this point that the flux lines that are depicted here, as well as in other figures, are shown for purposes of explanation only and are not intended to depict the actual circumstances other than in a general fashion. Accordingly, when the first signal receiving coil 42 enters over the wayside signal transmitting coil 16, it will be noted immediately beneath the right-hand portion of the coil 42 the voltage begins to rise, and as the signal receiving coil 42 assumes the dotted position 42', there are now a greater number of flux lines, such as 90 and 91, which pass through the first signal receiving coil 42. Accordingly, as this coil begins to pass over the signal transmitting coil 16, the voltage increases until it reaches a maximum when the first signal receiving coil 42 is in the position 42'. As the first signal receiving coil 42 moves along and over the wayside signal transmitting coil 16 the number of flux lines passing through the first signal receiving coil 42 cause a relatively constant voltage level to appear until the first signal receiving coil 42 enters the position shown as 42''', illustrated in dotted outline to the right of the figure. Of course, the reverse function of decreasing voltage takes place for the same reasons described earlier with reference to the increasing voltage in the left-hand portion of this illustration. Finally, when the first signal receiving coil 42 assumes the position 42''', the voltage drops to zero.

Before continuing with an explanation of the voltage patterns that appear with reference to the passage of the other coils referred to earlier, it should be noted that the voltage patterns that appear, one of which has just been described, are significant to the invention and the voltage values of these curves will be utilized as the additional criterion upon which to base a final determination of the passage of the object or vehicle carrying the coil arrangement 41.

Reference will now be made to the passage of the coil 43, which is referred to hereafter as the second signal receiving coil. This second signal receiving coil 43 must always travel in a path such that the plane of the coil is normal to the direction of travel. This is a requirement of the invention. Specifically, when the second signal receiving coil 43 is approaching the wayside signal transmitting coil 16, one can see that at least some, and in this case only one illustrated flux line 95 passes through the second signal receiving coil 43 when it is a significant distance from the signal transmitting coil 16. When this occurs the voltage starts to increase and as the second signal receiving coil 43 goes from the left to the right more of the flux lines pass through the second signal receiving coil 43 increasing the voltage as the second signal receiving coil 43 moves to the right. Accordingly, when the second signal receiving coil 43 assumes the position 43', shown in dotted outline, the flux lines, such as 96 and 97, will establish the greatest concentration of flux lines within the second signal receiving coil 43 and the voltage will reach its peak as the second signal receiving coil 43 passes over the left-hand end of the signal transmitting coil 16. As the second signal receiving coil 43 moves on toward the center of the signal transmitting coil 16 to the position shown at 43'', the voltage will decrease because, as is well known, the rectangular-shaped coil will have flux paths which, if shown in a three-dimensional fashion, would describe a doughnut-shaped configuration with a central portion of the coil being the hole of the doughnut.

In this instance we have shown but a few of the flux lines for purposes of illustrating the fact that when the second signal receiving coil 43 is midway between the end points of signal transmitting coil 16, little or no flux lines pass through the signal receiving coil 43 and therefore no voltage is induced in the second signal receiving coil 43 when in the position 43''. At this point the voltage drops to zero, or as may be referred to, reaches a null point and then as the second signal receiving coil 43 moves toward the position 43''', the voltage increases to a maximum for the same reason that were set forth with reference to the coil when it was in position 43', and then eventually the voltage decreases to zero when the coil reaches the position 43''''.

Reference is now made to the illustration depicted at the base of FIG. 3. In this illustration there is shown a third signal receiving coil 44, that is a coil which travels in a plane parallel to the plane which contains the wayside signal transmitting coil 16. It will be evident that since this coil is in a plane parallel to the wayside signal transmitting coil 16, the flux lines will tend to enter this coil slightly before they would effectively enter the vertically disposed second signal receiving coil 43, shown in the illustration just above, and as a practical matter there would be induced in the third signal receiving coil 44 a voltage which would increase until the third signal receiving coil 44 assumed a position 44', at which point because of the physical relationship of the third signal receiving coil 44 and the wayside signal transmitting coil 16, there would be a minor dip in the voltage due to the cancellation of certain voltages due to the flux lines entering and passing through the third signal receiving coil 44. This small reduction in voltage level is of no consequence to the invention because, as will be appreciated hereafter, as the third signal receiving coil 44 enters the center position 44'', the voltage increases steadily over this middle range as the third signal receiving coil 44 passes from the left-hand to the right-hand side of the wayside signal transmitting coil 16. Of course, when the third signal receiving coil 44 reaches a position 44′′′, again there is a minor dip in the voltage. Finally, when the third signal receiving coil 44 reaches a position 44′′′′, the voltage drops to zero.

At this point all of FIG. 3 should be reviewed with the thought of noting the following factors. Note, in the middle of a signal transmitting coil passage when the second signal receiving coil 43 is in the position 43′′, which is the middle of the signal transmitting coil, the voltage induced in this coil has dropped to zero or a null point, while in the first signal receiving coil 42 and the third signal receiving coil 44, which coils are in the central position, the voltage is at a peak level. It is the presence of these peak level voltages coupled with a null which will be utilized in the description which follows with reference to FIG. 4 that allows this invention to produce the precision indication of the passage of the multiplanar coil proximity detector 41.

Figure 4:
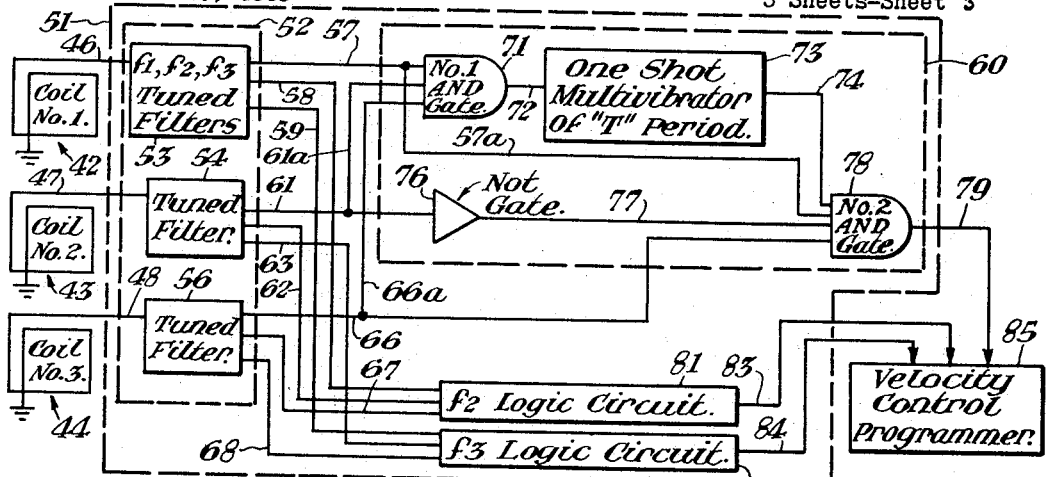
FIG. 4 is a partial circuit schematic, partial block diagram of a system embodying the invention.

Reference is now made to FIG. 4 which illustrates in a partial schematic circuit diagram, as well as a block diagram, the details of the equipment only shown in block diagram form in FIG. 1. Accordingly, it will be seen at the left-hand portion of this figure that there are present the signal receiving coil 42, which is referred to as the first coil, the signal receiving coil 43, which is referred to as the second coil, and the signal receiving coil 44, which is referred to as the third coil. Each of these signal receiving coils 42, 43 and 44 is electrically coupled to the coil signal logic unit 51 by leads 46, 47 and 48, respectively, the coil signal logic unit 51 being shown in dotted outline in this figure. The leads 46, 47 and 48 from the signal receiving coils 42, 43 and 44 also enter the signal detection unit 52, referred to hereafter as a signal detecting means. The signal detecting means 52 has a series of tuned filters 53, 54 and 56, the tuned filters being tuned respectively to the frequencies $f1$, $f2$ and $f3$ in order that this system function in the environment set forth in FIG. 1. Accordingly, each of the tuned filters 53, 54 and 56 has three outputs emanating therefrom which represent the three different possible frequencies that may be passed by the tuned filters. Tuned filter 53 has output leads 57, 58 and 59, while tuned filter 54 has output leads 61, 62 and 63, and the tuned filter 56 has output leads 66, 67 and 68. One of each of the outputs from the tuned filters will be fed to one of the three logic circuits illustrated to the right of the signal detecting means 52. The logic detection circuit for frequency $f1$ is designated by the reference numeral 60 and is shown in dotted outline in this figure. The other logic circuits for the frequencies $f2$ and $f3$ are shown by the block diagram boxes designated by the reference numerals 81 and 82. The logic circuits 81 and 82 are exactly the same as the logic circuit shown above and designated by the reference numeral 60. Accordingly, the logic circuit for the $f1$ frequency contains an AND gate 71 which is electrically coupled respectively to the tuned filters 53, 54 and 56 by lead 57 to tuned filter 53, by leads 61 and 61a to tuned filter 54, and by leads 66 and 66a to tuned filter 56.

The AND gate 71 has an output lead 72 which is delivered to a one-shot multivibrator having a "T" period. This one-shot multivibrator, which has been selected for use in this circuit, will be referred to hereafter as a delta time duration signal source for it should be understood that there are many types of devices that can provide a signal of a given period. For example, a clock might be employed. The delta time duration signal source 73 has an output lead 74 which is electrically coupled to an AND gate 78. The AND gate 78 is electrically coupled to tuned filter 53 via the leads 57 and 57a, and the AND gate 78 is also electrically coupled to the tuned filter 56 via the lead 66, and it will be noted that the tuned filter 54 is electrically coupled to the AND gate 78 via a circuit including the lead 61, an inverter 76, and lead 77. The output from the logic circuit 60 is represented by the lead from the AND gate 78 and is, in this instance, lead 79 which is fed to a velocity control programmer 85. The outputs from the $f2$ logic and $f3$ logic circuits are respectively leads 83 and 84 which also terminate in the velocity control programmer 85, which has been referred to as an object or vehicle stopping means in that the velocity control programmer 85 once activated initiates a control function over the propulsion unit to bring the vehicle to a stop.

In the simplest form the velocity control programmer 85 could be a brake that would be applied when the signal receiving coils pass over one of the wayside signal transmitting coils.

Figure 5:
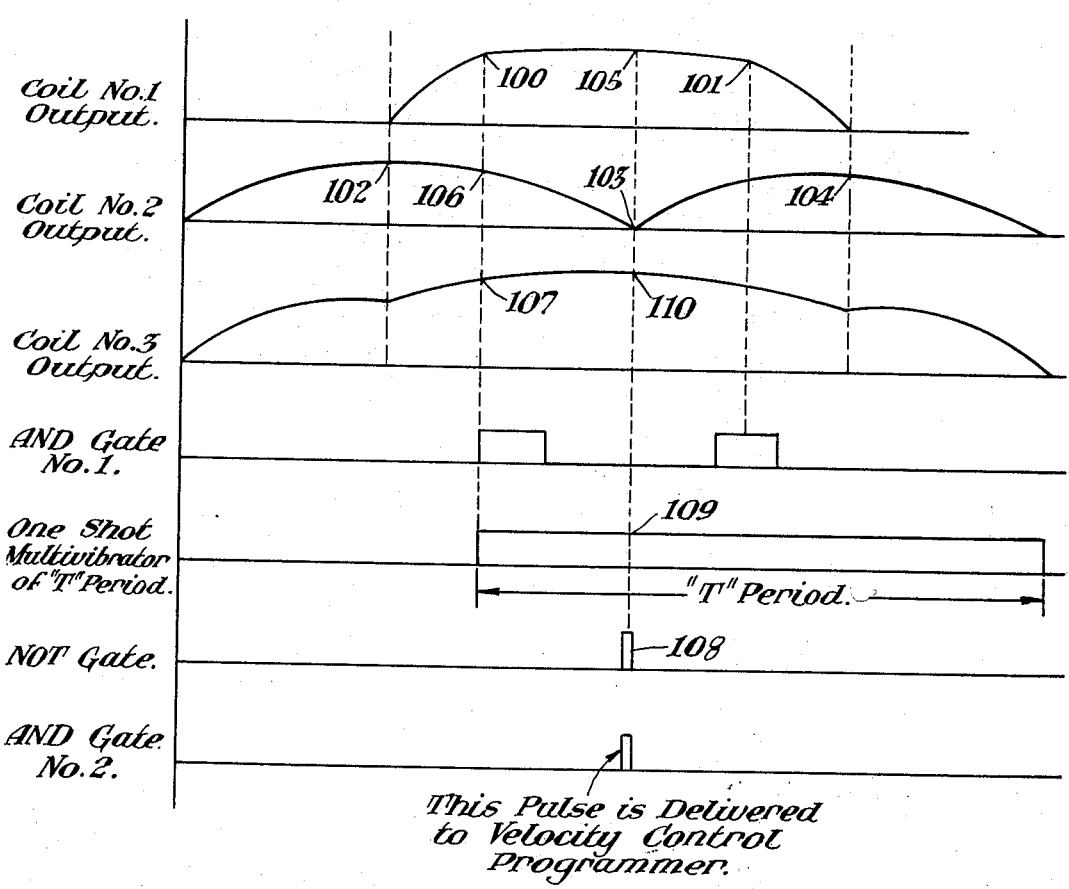
FIG. 5 is a timing chart which depicts the various conditions present in the partial circuit schematic of FIG. 4.

Immediately beneath FIG. 4 is FIG. 5. It will be noted that FIG. 5 contains a series of timing charts, and a review of the first three lines of the timing charts in FIG. 5 will show that the curves that are present there are indicative of voltage variations as the signal receiving coils 42, 43 and 44 pass by a wayside signal transmitting coil. Note that these voltage patterns that appear on the first three lines of the timing chart are the same curves that were generated in FIG. 3, and for that reason the manner in which they were derived will not be explained now but it will be assumed that their presence does take place in the fashion set forth earlier with reference to FIG. 3. A functional study now will be made of what happens when, for example, the vehicle stopping system is entering a station stopping area of the type illustrated in FIG. 1.

It will be assumed that the vehicle is just about to approach the first tuned wayside coil 14 which has been delivered an $f1$ frequency signal. In this instance, the signal receiving coils 42, 43 and 44 disposed above the track will be approaching the wayside signal transmitting coil 14 and as they receive the signals delivered by the $f1$ frequency source, these signals will enter the tuned filters 53, 54 and 56 over the leads 46, 47 and 48, respectively, and from each of these tuned filters there will be a single output. This output will be of the type shown on the first three lines of FIG. 5.

It will be appreciated that the output from the tuned filter 53 reaches its peak at point 100 on the curve and continues at a peak to point 101 on the curve, and then falls off to zero, as explained earlier. In a similar fashion the output from the tuned filter 54, which is indicative of the signal generated in the second signal receiving coil 43, will reach a peak at point 102 on the curve illustrated on the second line and will reach a null point or zero value at a point 103 on the curve and then reach another maximum at the point 104 on this curve, after which when the signal receiving coil 43 passes the wayside signal transmitting coil the voltage will drop to zero.

Also, it will be seen from line 3 that there is a graphic representation of the voltage pattern which appears at the outputs from the tuned filter 56. The voltage pattern is representative of the signal generated in the third signal receiving coil 44 and delivered to the tuned filter 56 via the lead 48. At the point 110 the voltage is at a maximum which is all that need be noted for the purpose of simplification. Accordingly, if one will view the timing charts set forth in FIG. 5 as representing real time starting on the left and going to the right, one can see that the outputs from leads 57, 61a, and 66a are all delivered to the AND gate 71. This is termed a first gate, and when the voltage level on these leads entering AND gate 71 reaches a voltage level designated by the reference numerals 100, 106 and 107, there will be present on the AND gate an all positive condition. When this occurs the AND gate will function in a normal fashion producing an output pulse which has been graphically illustrated on line 4 of the timing chart as a square wave pulse. The pulse with its leading edge will be delivered over the lead 72 to the delta time duration signal source 73 which, in this instance has been selected to be a one-shot multivibrator having a period "T" which is of sufficient length so that the system will operate with the slowest moving vehicle that may be anticipated to enter the system. The need for the selection and length "T" of the period will become more evident as the description ensues.

The output from the delta time duration signal source 73 will appear on the lead 74 and as represented by the signal of "T" period length shown on the fifth line of the timing chart.

Continuing now with the description, as the signal receiving coil arrangement passes over the wayside signal transmitting coil and reaches a mid point in its travel, it will be seen that at the first gate 71 there will be present on the lead 57 a peak voltage designated by the reference numeral 105, while on the leads 61 and 61a from the tuned filter 54, which is electrically coupled to the second signal receiving coil 43, the voltage will be zero or at a null point, designated by numeral 103, while the voltage on the leads 66 and 66a from the tuned filter 56 and its signal receiving coil 44 will be at a peak designated by the reference numeral 110. It is therefore apparent that there is no longer present at the AND gate a condition which will allow the AND gate to produce an output which of course is reflected by the absence of a signal on line 4 of the timing chart referred to as the AND gate No. 1.

At this very instant when the signal goes to zero on the lead 61 from the tuned filter 54, the inverter 76, or the NOT gate as it may be termed, will see a zero signal which in turn will produce a positive output from the gate 76, referred to as a second gate hereafter, on the lead 77, and this condition is depicted on line 6 of the timing chart by the pulse 108. At this very instant there are going to be a number of simultaneous conditions present at the third gate 78 which is also an AND gate. It will be noted that at this point in time there is a positive output on he lead 57 which has been designated by the point 105 on the curve of line 1 of the timing chart and this positive condition will be carried to the gate No. 3 over the leads 57 and 57a. Note also that the output from the one-shot multivibrator at a point in time designated by the reference numeral 109 on line 5 of the timing chart, is also in a positive condition and that the output from the third signal receiving coil 44, which is delivered over lead 66 to the third gate 78, is also in a positive condition which is indicated at point 110 on the curve shown on line 3 of the timing chart, and that finally the output from the second gate 76, which is a NOT gate or inverter, has delivered over the lead 77 to the third gate 78 a positive pulse designated by the pulse 108 on line 6 of the timing chart. Therefore, it will be seen that there are required to be present at the gate 78 four separate coinciding conditions before the third gate 78 will produce an output on the lead 79 to control the velocity control programmer 85. This will only occur at the precise moment that the output from the second signal receiving coil 43 reaches a zero point and both first and third signal receiving coils 42 and 44, respectively, have simultaneously induced in them a positive signal which has been preceded by the coils having reached some preselected voltage which causes the delta time duration signal source to produce its output which lends itself as an additional factor or criterion upon which to make a definitive determination of when the vehicle carrying its multiplanar coil proximity detector has reached the exact mid point of the wayside coil.

In view of the above description it is readily apparent that the system here takes into account significantly more criteria in the determination of the precise mid point of a wayside coil which may then be used as a reference to control vehicle stopping means to allow these vehicle means to know precisely the point at which the vehicle is away from the station or desired stopping point.

While the invention has been shown and described with reference to a preferred embodiment thereof, it will be understood by those skilled in the art that other modifications may be made therein without departing from the spirit and scope of the invention.

Having thus described my invention what I claim is:

1. A precision object stopping system to function along a predetermined way along which said object travels, said system including in combination,
   (a) at least one signal transmitting coil positioned along said way,
   (b) at least first and second signal receiving coils carried by said object,
      said first signal receiving coil positioned on said object in a plane which is at an angle to a plane containing said second signal receiving coil,
      said second signal receiving coil positioned on said object such that the direction of travel of said object is normal to a plane in which said second signal receiving coil is contained,
   (c) a coil signal logic means electrically coupled to said first and said second signal receiving coils and an object stopping means to thereby control said object stopping means whenever said first and said second signal receiving coils concurrently pass said signal transmitting coil and said second signal receiving coil has no output while simultaneously said first signal receiving coil does have an output.

2. The precision object stopping system of claim 1 wherein a normal to said plane containing said first signal receiving coil is perpendicular to said direction of travel of said object.

3. The precision object stopping system of claim 2 wherein said plane of said first signal receiving coil is parallel to a plane containing said signal transmitting coil.

4. The precision object stopping system of claim 2 wherein said plane of said first signal receiving coil is at right angles to a plane containing said signal transmitting coil.

5. The precision object stopping system of claim 1 wherein there are a plurality of wayside signal transmitting coils each having a signal output which differs from the other.

6. The precision object stopping system of claim 1 wherein said coil signal logic means includes signal detecting means having outputs corresponding to said first and said second coil outputs and responsive to the presence or absence of output signals from said first and second receiving coils to selectively control said object stopping means as said object moves along said way.

7. The precision object stopping system of claim 6 wherein said coil signal logic means also includes a logic circuit which is electrically coupled to said signal detecting means and to said object stopping means to control said object stopping means.

8. The precision object stopping system of claim 7 wherein said logic circuit includes a first gate electrically coupled to both of said outputs from said signal detecting means, said first gate having an output controllably coupled to a delta time duration signal producing means which has a delta time duration signal output,
   a second gate having an output and an input, said second gate input electrically coupled to said output from said signal detecting means corresponding to said output from said second signal receiving coil,
   a third gate electrically coupled to said output from said signal detecting means corresponding to said first signal receiving coil output, said delta time duration signal producing means output, and said output from said second gate.

9. The precision object stopping system of claim 8 wherein said first and third gates are AND gates and said second gate is an inverter.

10. A precision vehicle stopping system to function along a predetermined way along which said vehicle travels, said system including in combination,
- (a) a plurality of wayside signal transmitting coils each having a signal output which differs from the others,
- (b) at least first and second signal receiving coils carried by said vehicle,
    said first signal receiving coil positioned on said vehicle in a plane which is at an angle to a plane containing said second signal receiving coil,
    said second signal receiving coil positioned on said vehicle such that the direction of travel of said vehicle is normal to a plane in which said second signal receiving coil is contained,
- (c) a coil signal logic means electrically coupled to said first and said second signal receiving coils and a vehicle stopping means,
    said coil signal logic means including a signal detecting means responsive to said plurality of signal outputs from said wayside signal transmitting coils to selectively control said vehicle stopping means whenever said first and said second signal receiving coils concurrently pass said signal transmitting coil and said second signal receiving coil has no output while simultaneously said first signal receiving coil does have an output.

11. The precision vehicle stopping system of claim 10 wherein a normal to said plane containing said first signal receiving coil is perpendicular to said direction of travel of said vehicle.

12. The precision vehicle stopping system of claim 11 wherein said plane of said first signal receiving coil is parallel to a plane containing said signal transmitting coils.

13. The precision vehicle stopping system of claim 11 wherein said plane of said first signal receiving coil is at right angles to a plane containing said signal transmitting coils.

14. The precision vehicle stopping means of claim 13 wherein said coil signal logic means also includes a plurality of logic circuits equal in number to the number of different wayside signals from said plurality of wayside signal transmitting coils, each of said logic circuits is electrically coupled to said signal detecting means and to said vehicle stopping means to control said vehicle stopping means.

15. The precision vehicle stopping system of claim 14 wherein each of said logic circuits includes a first gate electrically coupled to both of said outputs from said signal detecting means, said first gate having an output controllably coupled to a delta time duration signal producing means which has a delta time duration signal output,
    a second gate having an output and an input, said second gate input electrically coupled to said output from said signal detecting means corresponding to said output from said second signal receiving coil,
    a third gate electrically coupled to said output from said signal detecting means corresponding to said first signal receiving coil output, said delta time duration signal producing means output, and said output from said second gate.

16. The precision vehicle stopping system of claim 15 wherein said first and third gates are AND gates and said second gate is an inverter.

References Cited

UNITED STATES PATENTS 2,554,056    5/1951    Peter et al.

ARTHUR L. LAPOINT, Primary Examiner

G. H. LIBMAN, Assistant Examiner

U.S. Cl. X.R.

246—63; 336—115